United States Patent Office 3,444,885
Patented May 20, 1969

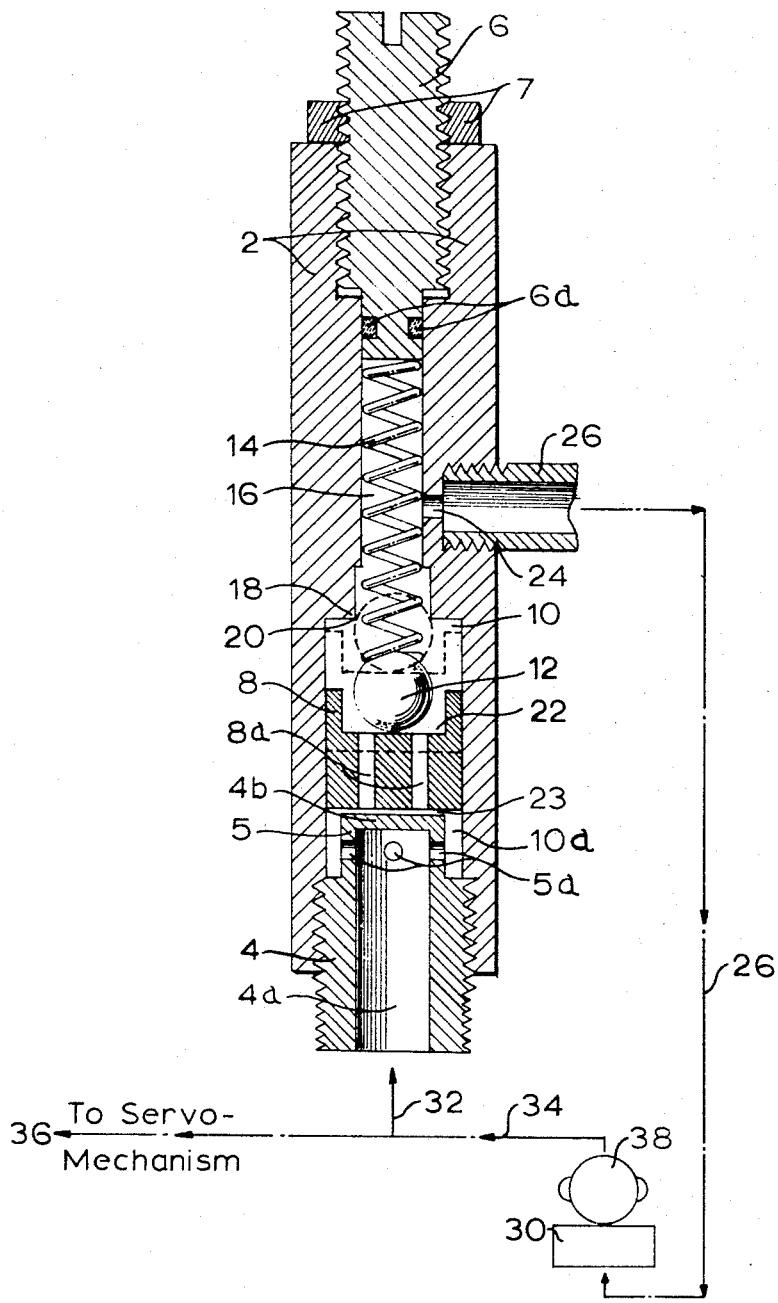

3,444,885
AUTOMATIC REDUCER OF FLUID FLOW AT LOW PRESSURE
Gildardo G. Sanchez, Mexico City, Mexico, assignor to Impulsora de Patentes Industriales, S.A., Mexico City, Mexico, a company of Mexico
Filed Dec. 27, 1965, Ser. No. 516,328
Int. Cl. F16k *17/04, 15/00*
U.S. Cl. 137—504        2 Claims

ABSTRACT OF THE DISCLOSURE

This invention is directed to a bypass flow reducing valve for pump-supplied fluid ducts operating under alternating and intermittent conditions of normal and reduced pressures. The valve is so constructed that the duct is under normal pressure no fluid will be bypassed through the valve, yet when the duct is under reduced pressure the valve will open to bypass fluid back to the sump of the supply pump. Fluid always remains in the duct.

---

This invention relates to means for reducing the flow of fluid in a pressure line or duct in response to pressure decrease in the duct. Such flow control is important in various fluid actuated systems such as, for example, hydraulic or pneumatic power steering or braking systems for wheeled vehicles.

The principal object of this invention is the provision of a simple, easily installed device which controls the fluid flow in a fluid-pressure operated system to cause reduced flow of fluid in a pressurized duct in the system in response to reduced pressure in said duct and to increase such flow upon increase of such pressure. Such flow control will operate to eliminate or greatly reduce operational failure of such systems and, in wheeled vehicles, for example, wherein such systems are widely employed to operate braking and/or steering means, the present invention will eliminate many vehicular accidents caused by such failures.

A preferred form of flow reducing device according to this invention is shown, for illustrative purposes, in the accompanying drawing; the single figure of said drawing being a central, longitudinal view of the device, and including a diagrammatic showing of the manner of its incorporation into one type of hydraulic system in which it is useful.

The illustrated flow reducing device is generally cylindrical and its parts are cylindrical or circular in cross section. The parts are of suitable relatively rigid material, preferably metal.

In the drawing, the parts of the flow reducer are shown in full lines in such interrelationship as to decrease or minimize fluid flow in the duct to which it is connected; while broken lines in the drawing indicate the interrelationship of parts when the device is in condition to permit full or undiminished flow in said duct.

The automatic flow reducer of this invention comprises, as its principal parts, a body 2, a connection nipple 4 threaded into one end of said body, a closing and spring-adjusting screw 6 threaded into the opposite end of the body 2 and sealed by a suitable packing ring 6a, a piston 8 slidable axially within a cylindrical chamber 10 above the connection nipple, a valve element which in the illustrated embodiment is shown as a ball 12, and a coil spring 14 disposed within a passage 16 and compressed between the adjusting screw 6 and the ball 12.

The upper end of the nipple 4 is closed by an integral plug or wall 4b and is reduced to the form of a collar 5 having open ports 5a therein, and being surrounded by a lower annular area 10a of the chamber 10. The chamber 10 is of greater diameter than the passage 16 and terminates at its upper end in a shoulder 18 where it communicates with said passage. The inner periphery of the shoulder 18 constitutes a valve seat 20 against or within which the valve element 12 seats under high pressure conditions.

The piston 8 is formed with a circular recess 22 within which the valve element 12 is disposed with said valve element in contact with a central point or area at the bottom of recess 22 to enable the valve element and the piston to cooperate with each other in axial movement as hereinafter explained.

The recess 22 is of greater diameter than valve element 12 so that said recess is in constant fluid communication with the upper end of the chamber 10. The piston 8 is formed with a suitable plurality of longitudinal passages 8a preferably arranged circularly and concentrically so that the upper ends of said passages open into the recess 22 clear of the valve element 12. The lower ends of the passages 8a are open at the bottom of the piston 8 and, when the reducer is in its illustrated full time condition, said passages communicate with passage 4a, through a space 23, annular area 10a of chamber 10, and ports 5a.

At some distance above the shoulder 18, the body 2 is formed with a port 24 which opens into a pipe 26 which, when the pressure medium is liquid, connects the reducer to a sump or liquid supply tank 30. Where the device according to this invention is employed with air or other gas as the pressure medium, the port 24 may be a simple port suitable for exhausting gas to ambient atmosphere.

The subject device ordinarily would be connected by its nipple 4 and a T-connection 32 to a pressure duct or pipe 34 interconnecting a servo-mechanism 36 and a pump 38 which is connected to the supply tank 30.

When in the operation of a fluid pressure system, in which the subject fluid flow reducer is employed, the pressure in pipe 34 is relatively high, the moving parts of this device are substantially as shown in broken lines in the drawing. In that situation, the high pressure of fluid in pipe 34 is operative through passage 4a, ports 5a, and chamber area 10a to force the piston 8 and ball 12 upwardly to close the chamber 10 at its upper end and thereby maintain the desired fluid pressure in the duct 34 and at the servo-mechanism 36.

If the pressure of the fluid in the pipe 34 is substantially decreased, the pressure is insufficient to hold the ball 12 up in its closed position but suffices to maintain the open space at 23 so that pressure fluid is bled from the pipe 34 through the subject flow reducer and pipe 26 to the tank 30, thereby maintaining low-fluid pressure at the servo-mechanism 36.

I claim:
1. A device for controlling flow in a fluid pressure system that includes a pump-supplied fluid duct operable under alternate and intermittent conditions of normal and reduced pressures, comprising a valve body provided at one end with an axial bore defining a chamber, the inner end of said axial bore extending into open communication with a continuing axial bore of reduced diameter, the junction between said bores together defining a valve seat; a connection nipple fixed in the open end of said first mentioned axial bore for connecting the device to said fluid duct and having a closed upper end of a diameter less than that of said axial bore and being provided with a plurality of radially extending ports affording fluid communication between the interior of said nipple and said chamber; a piston slidably disposed within said chamber above the closed end of said nipple and being provided at its upper end with a valve closing portion engageable with said valve seat, said piston being provided with axially extending passages affording fluid communication between those portions of said chamber above and below said piston; said valve body being provided with a discharge port extending into open communication with said reduced diameter axial bore, yieldable means coacting between said valve body and said piston and its said valve closing portion to constantly exert a downward force thereon, said yieldable means being sufficiently strong to move said piston and its said valve closing portion away from closing engagement with said valve seat under conditions of reduced pressure in said duct to permit fluid flow through said discharge port but insufficiently strong to prevent said piston and its said valve closing portion from being moved into closing engagement with said valve seat under conditions of normal pressure to stop fluid flow through said discharge port.

2. The device of claim 1 in which the valve closing portion of said piston is a ball disposed freely within an axial recess in the upper end of said piston and in which said yieldable means is a compression spring interposed between said ball and an adjustable abutment contained within said reduced diameter axial bore.

References Cited

UNITED STATES PATENTS

| | | | |
|---|---|---|---|
| 1,271,304 | 7/1918 | Floyd | 137—533.11 |
| 2,164,272 | 6/1939 | Higgins et al. | 137—498 XR |
| 2,411,392 | 11/1946 | Saville | 137—498 |

M. CARY NELSON, *Primary Examiner.*

ROBERT J. MILLER, *Assistant Examiner.*